United States Patent [19]

Bonnaud et al.

[11] 4,330,456

[45] May 18, 1982

[54] CONTINUOUS PROCESS FOR PRODUCING A FINELY DIVIDED AQUEOUS DISPERSON OF A HOMOGENEOUS PHASE OF AT LEAST ONE FUSIBLE SOLID INGREDIENT

[75] Inventors: Bernard Bonnaud, Sisteron; Jean-Bernard Pompon, Saint-Auban, both of France

[73] Assignee: Chloe Chimie, Puteau, France

[21] Appl. No.: 973,009

[22] Filed: Dec. 26, 1978

[30] Foreign Application Priority Data

Jan. 5, 1978 [FR] France ............................... 78 00193

[51] Int. Cl.[3] ............................................... C08J 3/20

[52] U.S. Cl. ..................................... 524/46; 524/128; 524/114; 524/375; 524/297; 524/310; 524/313; 524/381; 524/94; 524/503; 524/517; 524/569

[58] Field of Search ............... 260/28.5 D, 34.2, 42.55

[56] References Cited

U.S. PATENT DOCUMENTS

| | | | |
|---|---|---|---|
| 2,373,347 | 4/1945 | Schoenfeld | 260/34.2 |
| 3,898,189 | 8/1975 | Bonnaud | 260/34.2 |
| 4,119,601 | 10/1978 | Bonnaud | 260/34.2 |

*Primary Examiner*—Paul R. Michl

*Attorney, Agent, or Firm*—McDougall, Hersh & Scott

[57] ABSTRACT

Continuous process for producing a finely divided aqueous dispersion of a homogeneous phase of at least one fusible solid ingredient and possibly of at least one liquid ingredient in which an aqueous solution of dispersion additive with a melted homogeneous phase is continuously subjected to a high velocity gradient in an agitation zone. The respective temperatures and flow rates of the aqueous solution and the homogeneous phase are regulated so that the homogeneous phase of the dispersion thusly produced reaches its solidification temperature after the dispersion has been evacuated from the agitation zone and before thermal equilibrium between the aqueous solution and the homogeneous phase is reached.

13 Claims, No Drawings

CONTINUOUS PROCESS FOR PRODUCING A FINELY DIVIDED AQUEOUS DISPERSON OF A HOMOGENEOUS PHASE OF AT LEAST ONE FUSIBLE SOLID INGREDIENT

The present invention relates to a continuous process for producing a finely divided aqueous dispersion of a homogeneous phase consisting of at least one fusible solid ingredient, and to the aqueous dispersions prepared by said process.

French Pat. No. 2,216,311 covers the preparation of vinyl chloride base polymer and copolymer pulverulent compositions for immediate use by a process according to which vinyl chloride base polymers and copolymers and the various additives necessary for their implementation such as stabilizers, plasticizers, lubricants, pigments, colorants, loads, polymer modifying agents are mixed in an aqueous medium, after which the compositions are separated from the aqueous medium and dried. In accordance with the described process, the liquid additives and at least a part of the fusible solid additives are introduced into the mixing zone, and maintained with agitation in the form of at least one finely divided aqueous dispersion of a homogeneous phase. This homogeneous phase is obtained by mixing the ingredients heated to a temperature higher than the solidification temperature of said mixture. The length of time during which such a dispersion can be stored at ambient temperature under agitation is very limited and generally does not exceed 5 hours because, most often, the dispersion coagulates when, during cooling, the dispersed homogeneous phase reaches its solidification temperature. Furthermore, its storage at a temperature higher than the solidification temperature of the homogeneous phase would require permanent vigorous agitation in order to avoid coalescence of the particles; it would also cause hydrolysis reactions detrimental to its properties.

In accordance with the process of this invention, it is possible to obtain a finely divided aqueous dispersion, which remains stable during storage at ambiant temperature under agitation, of a homogeneous phase containing at least one solid fusible ingredient and possibly at least one liquid ingredient. The term, ambiant temperature, as used herein, is meant to refer to a temperature generally comprised between 5° and 30° C., without it being necessary to consider this interval as limitative. The above-mentioned ingredients are especially selected from those usable for the preparation of vinyl chloride base polymer and copolymer pulverulent compositions, such as stabilizers, plasticizers, lubricants, pigments, colorants, loads.

According to the process of this invention, an extemporaneous mixture obtained by contact of an aqueous solution of dispersion additive and a melted homogeneous phase is subjected continuously to a high velocity gradient, in an agitation zone. By "extemporaneous", it is meant that the mixture has been prepared in less than a second, and preferably, in less than 0.2 second, before its arrival in the agitation zone.

According to the process of this invention, the respective temperatures and flow rates of the aqueous solution and the homogeneous phase are regulated so that the homogeneous phase of the dispersion thusly produced reaches its solidification temperature after the dispersion has been evacuated from the agitation zone and before thermal equilibrium between the aqueous solution and the homogeneous phase is reached.

It has been noted that by operating so that the dispersed homogeneous phase passes from melted state to solid state outside the agitation zone and, while the aqueous phase of the dispersion is at a temperature lower than the solidification temperature of the homogeneous phase, no coagulation of the dispersion is observed during cooling and a dispersion which remains stable during storage at ambient temperature under agitation is obtained. In the opposite case, where the dispersed homogeneous phase passes from melted state to solid state in the agitation zone and/or when the aqueous phase of the dispersion is at a temperature equal to the solidification temperature of the homogeneous phase, coagulation of the dispersion is observed during cooling. The solidification temperature of the homogeneous phase is generally between 40° and 80° C.

As fusible solid ingredients, we can cite lubricants such an ester waxes, natural waxes, polyethylene waxes, paraffin waxes, fatty acids, fatty alcohols, amines of fatty acids; vinyl chloride base polymer and copolymer stabilizers such as alphaphenylindol, calcium hydroxystearate, zinc stearate, calcium stearate.

In addition to the fusible solid ingredient(s), the homogeneous phase may also contain pure liquid ingredients or solutions of solid ingredients in solvents. In this category, are vinyl chloride base polymer end copolymer stabilizers, such as organic salts of tin, short chain metallic soaps; lubricants such as esters of glycerol and oleic acid, esters of glycerol and ricinoleic acid; antioxidizers such as trinonylphenylphosphite; plasticizers such as dioctyl phthalate, epoxidized soya oil. The quantity of liquid ingredients used for the preparation of the homogeneous phase can vary from 0 to 70 parts by weight per 100 parts by weight of the homogeneous phase.

Depending on the composition of the homogeneous phase to be treated and the fineness of the dispersion desired, the scientist has at his disposal the technology needed to satisfy the required conditions in order to implement the process in the invention by working within the following parameters.

Respective temperatures and flow rates of the aqueous solution and homogeneous phase: The respective flow rates of the aqueous solution and homogeneous phase must be sufficiently high with respect to the volume of the agitation zone so that the dispersion is evacuated from the agitation zone before the homogeneous phase has reached its solidification temperature and before thermal equilibrium between the aqueous solution and the homogeneous phase is reached. For example, for an agitation zone with a volume of 100 $cm^3$, the flow rates are generally between 1000 and 10000 l/h (liters per hour) for the aqueous solution and 700 and 7000 l/h for the homogeneous phase. The ponderal ratio of the flow rates of the aqueous solution and the homogeneous phase is determined by the ponderal concentration in dry material of the dispersion desired. The temperature of the homogeneous phase, during contact with the aqueous solution, must be sufficiently high, all thing being equal, so that the dispersion is evacuated from the agitation zone before the homogeneous phase reaches its solidification temperature. The temperature of the aqueous solution, during contact with the homogeneous phase, must obviously be lower than the solidification temperature of the homogeneous phase; all things being equal, the temperature of the aqueous solution must be sufficiently low so that the thermal equilibrium between the aqueous solution and the homogeneous phase is reached after the homogeneous phase has reached its solidification temperature. When the aqueous solution and the homogeneous phase are put in contact, the temperatures of the aqueous solution and the homogeneous phase are generally between 0° and 50° C. and 80° and 150° C., respectively.

Velocity gradient in the agitation zone: This depends on the fineness of the dispersion desired. To obtain a dispersion with particle diameters between 1 and 40 microns, the velocity gradient applied, calculated for a laminar flow, is generally between 10,000 and 100,000 seconds - 1. Although the velocity gradient is calculated on the presumption of a laminar flow in the agitation zone, it must be noted that for the velocity gradients actually applied, the type of flow is highly turbulent.

Nature and ratio of dispersion additive: A dispersion additive, which is chemically inert with respect to the ingredients to be dispersed, is used. As dispersion additives, use can be made of non-ionic emulsifying agents such as alkylphenolpolyoxyethylenes, protector colloids such as methylcelluloses, polyvinyl alcohol, copolymers of maleic anhydride and styrene partially neutralized by potash or soda. These are generally used in a ratio of 0.2 to 20% by weight with respect to the homogeneous phase to be dispersed.

To implement the process according to the invention, it is better to use a homogenizer apparatus of the type consisting of a stator and a rotor. The stator, in the form of a casing, is equipped with a supply device (inlet) with two concentric pipes and with a single pipe evacuation device (outlet); the rotor has one or more moving bodies, the surfaces of which are located a short distance from the interior surface of the stator. An apparatus excellently suited to the desired objective is a cylindrical casing containing a cylindrical body capable of rotating at high speed and having a diameter slightly less than the interior diameter of the casing, for example by 1 mm or less. Through each of the supply pipes respectively, each one equipped with a valve permitting flow regulation, the aqueous solution of dispersion additive and the homogeneous phase are fed into the apparatus, its rotor rotating at high speed, for example between 2,000 and 10,000 r.p.m. In the narrow space provided between stator and rotor, the aqueous solution - homogeneous phase mixture obtained when the apparatus is fed, is immediately subjected to a high velocity gradient caused by rotation of the rotor, and this produces the desired dispersion and its evacuation from the apparatus through the outlet pipe furnished for this purpose in which only thermal equilibrium between the aqueous solution and the homogeneous phase is reached.

With the process of the invention, it is possible to obtain aqueous dispersions, with average particle size generally between 1 and 40 microns, stable for storage at ambiant temperature under agitation and having ponderal concentrations in dry material of 10 to 40% and up to 50%. Agitation during storage, while being moderate, should be sufficient to maintain the particles of the dispersion in suspension. It should not be so violent as to result in their reagglomeration. When there is no agitation, particle sedimentation is observed, but these can be easily put back in suspension by agitation.

Several examples carrying out the process according to the invention are hereinafter given for purposes of illustration and not by way of limitation.

EXAMPLE 1

This example is given for comparison purposes.

In a 7500 liter useful capacity melting pot, by heating to 110° C. and stirring the ingredients constituting the homogeneous phase, a homogeneous phase is produced which is composed of 3750 kg epoxidized soya oil, 1750 kg hydrogenated castor oil, 400 kg alphaphenylindol and 300 kg glycerol trimontanate. This homogeneous phase is poured into a 20 $m^3$ capacity vat containing 2250 kg of an aqueous solution having 0.27% by weight of cellulose methyl ether, the aforementioned solution having been preheated to 75° C. and having undergone agitation in the vat by means of a 150 cm diameter helix rotating at 40 r.p.m. and a 20 cm diameter turbine rotating at 3000 r.p.m.

After 2 hours of agitation, an aqueous dispersion is obtained, its ponderal concentration in dry material being 40%, its particles having an average diameter of 30 microns and its temperature being 85° C.

After the turbine is stopped, it is noted that this dispersion coagulates as soon as its temperature drops below 50° C.

EXAMPLE 2

At 110° C., under the same conditions as in example 1, a homogeneous phase with the same composition is prepared. Its solidification temperature is approximately 50° C.

At 10° C., an aqueous solution having 0.27% by weight of cellulose methyl ether is prepared.

In a 100 $cm^3$ useful capacity homogenizer apparatus, of the type with rotor, stator, two concentric supply pipes and one evacuation pipe, the 175 mm diameter rotor rotates at 3000 r.p.m., with the distance between rotor and stator being 0.5 mm, the aqueous solution, at a rate of 4700 kg/h, and the homogeneous phase at a rate of 3150 kg/h, are separately introduced. An aqueous dispersion is obtained, its ponderal concentration in dry material being 40%, its particles having an average diameter of 22 microns and its temperature being approximately 45° C. when thermal equilibrium is reached between aqueous solution and homogeneous phase.

This dispersion does not coagulate or separate during storage in a 20 $m^3$ capacity vat equipped with a 150 cm in diameter helix rotating at 40 r.p.m.

EXAMPLE 3

This example is given for comparison purposes.

In a 5000 liter useful capacity melting pot, by heating to 120° C. and stirring the ingredients constituting the homogeneous phase, a homogeneous phase is produced which is composed of 2000 kg epoxidized soya oil, 1750 kg hydrogenated castor oil, 400 kg alphaphenylindol and 300 kg glycol diethylene dimontanate. This homogeneous phase is poured into a 15 $m^3$ capacity vat containing 6640 kg of an aqueous solution having 0.5% by weight of copolymer of maleic anhydride and styrene neutralized with potash, said solution having previously been heated to 80° C. and having undergone agitation in the vat by means of a 120 cm diameter helix rotating at 40 r.p.m. and a 20 cm diameter turbine rotating at 3000 r.p.m.

After 2 hours of agitation, an aqueous dispersion is obtained, its ponderal concentration in dry material being 40%, its particles having an average diameter of 10 microns and its temperature being 90° C.

After the turbine is stopped, it is noted that this dispersion coagulates as soon as its temperature drops below 58° C.

EXAMPLE 4

At 120° C., under the same conditions as in example 3, a homogeneous phase of the same composition is prepared. Its solidification temperature is approximately 58° C.

At 20° C. an aqueous solution having 0.5% by weight of copolymer of maleic anhydride and styrene neutralized by potash is prepared.

In the homogenizer apparatus described in example 2, the rotor of which is rotated at 3000 r.p.m., the aqueous solution, at a rate of 4700 kg/h, and the homogeneous phase, at a rate of 3150 kg/h, are separately introduced. An aqueous dispersion is obtained, its ponderal concentration in dry material being 40%, its particles having an average diameter of 8 microns and its temperature being approximately 54° C. when thermal equilibrium between aqueous solution and homogeneous phase is reached.

This dispersion does not develop or coagulate during storage in a 15 $m^3$ capacity vat equipped with a 120 cm in diameter helix rotating at 40 r.p.m.

EXAMPLE 5

This example is given for comparison purposes.

In a 4000 liter useful capacity melting pot, by heating to 115° C. and stirring the ingredients constituting the homogeneous phase, a homogeneous phase is produced which is composed of 1000 kg epoxidized soya oil, 1750 kg hydrogenated castor oil, 400 kg alphaphenylindol and 300 kg glycol diethylene dimontanate. Said homogeneous phase is poured into a 15 $m^3$ capacity vat containing 5150 kg of an aqueous solution having 0.17% by weight of partially hydrolyzed polyvinyl alcohol, the aforementioned solution having previously been heated to 80° C. and having undergone agitation in a vat by means of a 120 cm diameter helix rotating at 40 r.p.m. and a 20 cm diameter turbine rotating at 3000 r.p.m.

After 2 hours of agitation, an aqueous dispersion is obtained, its ponderal concentration in dry material being 40%, its particles having an average diameter of 25 microns and its temperature being 90° C.

After the turbine is stopped, it is noted that this dispersion coagulates as soon as its temperature drops below 64° C.

EXAMPLE 6

At 115° C., under the same conditions as in example 5, a homogeneous phase with the same composition is prepared. Its solidification temperature is approximately 64° C.

At 20° C. an aqueous solution with 0.17% by weight of partially hydrolyzed polyvinyl alcohol is prepared.

In the homogenizer apparatus described in example 2, the rotor of which rotates at 3000 r.p.m., the aqueous solution, at a rate of 4700 kg/h, and the homogeneous phase, at a rate of 3150 kg/h, are separately introduced. An aqueous dispersion is obtained, its ponderal concentration in dry material being 40%, it particles having an average diameter of 17 microns and its temperature being approximately 55° C. when thermal equilibrium between aqueous solution and homogeneous phase is reached.

This dispersion does not develop or coagulate during storage in a 15$m^3$ capacity vat equipped with a 120 cm diameter helix rotating at 40 r.p.m.

EXAMPLE 7

This example is given for comparison purposes.

In a 130 liter useful capacity melting pot, by heating to 125° C. and stirring the ingredients constituting the homogeneous phase, a homogeneous phase is produced which is composed of 70 kg hydrogenated castor oil, 15 kg glycol diethylene dimontanate, 20 kg alphaphenylindol, 9 kg zinc stearate, 6 kg calcium stearate. This homogeneous phase is poured into a 500 liter capacity vat containing 300 kg of an aqueous solution having 0.27% by weight of cellulose methyl ether, the aforementioned solution having previously been heated to 80° C. and having undergone agitation in the vat by means of a 30 cm diameter helix rotating at 100 r.p.m. and a 15 cm diameter turbine rotating at 3000 r.p.m.

After 15 minutes of agitation, an aqueous dispersion is obtained, its ponderal concentration in dry material being 29%, its particles having an average diameter of 22 microns and its temperature being 90° C.

After the turbine is stopped, it is noted that this dispersion coagulates as soon as the temperature drops below 60° C.

EXAMPLE 8

At 125° C., under the new conditions as in example 7, a homogeneous phase with the same composition is prepared. Its solidification temperature is approximately 60° C.

At 35° C., an aqueous solution having 0.27% by weight of cellulose methyl ether is prepared.

In a 50 $cm^3$ useful capacity homogenizer apparatus, of the type with rotor, stator, two concentric supply pipes and one evacuation pipe, the rotor of which, having a diameter of 160 mm, rotates at 3000 r.p.m., and the distance between stator and rotor is 0.5 mm, an aqueous solution, at a rate of 150 kg/mn, and the homogeneous phase, at a rate of 60 kg/mn, are separately introduced. An aqueous dispersion is obtained, its ponderal concentration in dry material being 29%, its particles having an average diameter of 15 microns and its temperature being approximately 55° C. when thermal equilibrium between aqueous solution and homogeneous phase is reached.

This dispersion does not develop or coagulate during storage in a 500 liter capacity vat equipped with a 30 cm diameter helix rotating at 100 r.p.m.

It will be understood that changes may be made in the details of the compositions and conditions, without departing from the spirit of the invention, especially as defined in the following claims.

We claim:

1. In the preparation of vinyl chloride based polymer and copolymer compositions in which ingredients such as stabilizers, lubricants, plasticizers, fillers and pigments are mixed with the vinyl chloride based polymers and copolymers to form compositions for subsequent processing wherein the liquid ingredients and at least a part of the fusible solid ingredients are introduced into the mixing zone in the form of one or more finely divided aqueous dispersions to a homogeneous phase and wherein the said finely divided aqueous dispersion or dispersions of a homogeneous phase of at least one fusible solid ingredient and which may include at least one liquid ingredient is produced in a process comprising forming an extemporaneous dispersion by subjecting to a high velocity gradient in an agitation zone (1) an aqueous solution of dispersion additive and (2) the homogeneous phase of the fusible solid ingredients in a molten state and which may include at least one liquid ingredient, the improvement wherein the aqueous solution and the homogeneous phase are introduced continuously into the agitation zone to form a dispersion, continuously removing the formed dispersion from the agitation zone, and regulating the temperature and the flow rate of the aqueous solution and homogeneous phase so that the homogeneous phase of the dispersion reaches its solidification temperature only after the dispersion has been removed from the agitation zone but before thermal equilibrium is reached between the aqueous solution and the homogeneous phase.

2. The process as claimed in claim 1, in which the fusible solid ingredients are lubricants.

3. The process as claimed in claim 2 in which the lubricants are selected from the group consisting of ester waxes, natural waxes, polyethylene waxes, paraffin waxes, fatty acids, fatty alcohols, and amines of fatty acids.

4. The process as claimed in claim 2 in which the stabilizers are selected from the group consisting of alpha phenylindol, calcium hydroxystearate, zinc stearate and calcium stearate.

5. The process as claimed in claim 1, in which the liquid ingredients are selected from the group consisting of stabilizers, lubricants, antioxydizers and plasticizers for the polymers and copolymers based on vinyl chloride.

6. The process as claimed in claim 5 in which the stabilizers are selected from the group consisting of organic salts of tin and short metallic soaps.

7. The process as claimed in claim 5 in which the lubricants are selected from the group consisting of esters of glycerol and oleic acid and esters of glycerol and ricinoleic acid.

8. The process as claimed in claim 5 in which the antioxidant is trionylphenylphosphite.

9. The process as claimed in claim 5 in which the plasticizer is selected from the group consisting of dioctyl phthalate and epoxidized soya oil.

10. The process as claimed in claim 1, in which the quantity of liquid ingredients used for the preparation of the homogeneous phase varies from 0 to 70 parts by weight for 100 parts by weight of homogeneous phase.

11. The process as claimed in claim 1, in which, as the dispersion agent use is made of at least one compound selected from the group consisting of non-ionic emulsifying agents and protective colloids, in a ratio of 0.2 to 20% by weight with respect to the homogeneous phase to be dispersed.

12. The process as claimed in claim 11 in which the non-ionic emulsifying agent is an alkylphenolpolyoxyethylene.

13. The process as claimed in claim 11 in which the protective colloid is selected from the group consisting of a methyl cellulose, polyvinyl alcohol, copolymers of maleic anhydride and styrene partially neutralized with potash or soda.

* * * * *